United States Patent Office 3,270,021
Patented August 30, 1966

3,270,021
(±)-8-AZAOESTR- AND -8-AZAGONA-5-(10)-en-17β-ol-3-ONE AND ACID ADDITION SALTS THEREOF
Richard Clarkson, Macclesfield, England, assignor to Imperial Chemical Industries Limited, London, England, a corporation of Great Britain
No Drawing. Filed Apr. 21, 1964, Ser. No. 361,554
Claims priority, application Great Britain, May 10, 1963, 18,624/63
5 Claims. (Cl. 260—286)

This invention relates to heterocyclic compounds which possess therapeutic properties and which are useful as intermediates.

According to the invention we provide heterocyclic compounds of the formula:

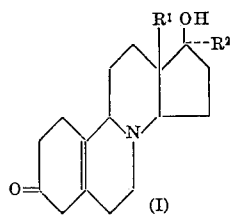

wherein $R^1$ stands for a lower alkyl radical, and $R^2$ stands for hydrogen or a lower alkyl, lower alkenyl or lower alkynyl radical, and the salts thereof.

As one embodiment of the invention there may be mentioned, for example, those of the compounds of the Formula I which have the gonane configuration. It is to be understood that in this specification expressions such as "lower alkyl radical" or "lower alkenyl radical" etc., mean alkyl or alkenyl radicals, respectively, of not more than 6 carbon atoms. It is also to be understood that unqualified expressions such as "alkyl radical" or "aralkyl radical" only encompass unsubstituted alkyl or aralkyl radicals respectively.

As a suitable value for $R^1$, or for $R^2$ when it stands for a lower alkyl radical, there may be mentioned, for example, the methyl, ethyl or n-propyl radical. As a suitable value for $R^2$ when it stands for a lower alkenyl or alkynyl radical there may be mentioned, for example, the vinyl, allyl or ethynyl radical.

Specific heterocyclic compounds of the invention are, for example, (±)-8-azaoestr-5(10)-en-17β-ol-3-one,
(±)-17α-methyl-8-azaoestr-5(10)-en-17β-ol-3-one,
(±)-17α-ethyl-8-azaoestr-5(10)-en-17β-ol-3-one,
(±)-17α-ethynyl-8-azaoestr-5(10)en-17β-ol-3-one,
(±)-17α-allyl-8-azaoestr-5(10)-en-17β-ol-3-one,
(±)-13-ethyl-8-azagona-5(10)-en-17β-ol-3-one,
(±)-13,17α-diethyl-8-azagona-5(10)-en-17β-ol-3-one,
(±)-13-ethyl-17α-ethynyl-8-azagona-5(10)-en-17β-ol-3-one,
(±)-13-n-propyl-8-azagona-5(10)-en-17β-ol-3-one,
(±)-17α-ethyl-13-n-propyl-8-azagona-5(10)-en-17β-ol-3-one, and
(±)-17α-ethynyl-13-n-propyl-8-azagona-5(10)-en-17β-ol-3-one, and the salts thereof.

As suitable salts of the heterocyclic compounds of the invention there may be mentioned, for example, acid-addition salts, for example salts derived from inorganic acids, for example hydrochloric acid, or from organic acids, for example oxalic acid.

According to a further feature of the invention we provide a process for the manufacture of the compounds of Formula I and the salts thereof which comprises the hydrolysis of a compound of the formula:

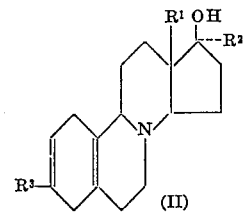

wherein $R^1$ and $R^2$ have the meanings stated above, and $R^3$ stands for an alkoxy or aralkoxy radical.

As a suitable value for $R^3$ there may be mentioned, for example, a lower alkoxy radical, for example the methoxy radical, or an aralkoxy radical of not more than 12 carbon atoms, for example the benzyloxy radical.

The hydrolysis may be effected by the use of an inorganic acid, for example hydrochloric acid, or an organic acid, for example oxalic acid, conveniently in a diluent or solvent, for example water, and in an inert atmosphere, for example an atmosphere of nitrogen.

The compounds of Formula II may be obtained by the following sequence of reactions:

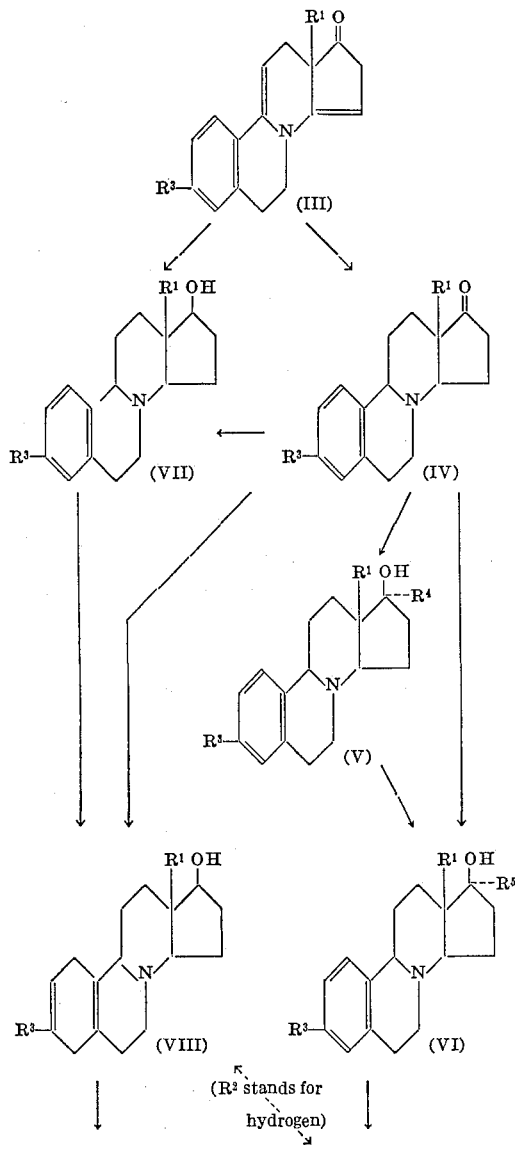

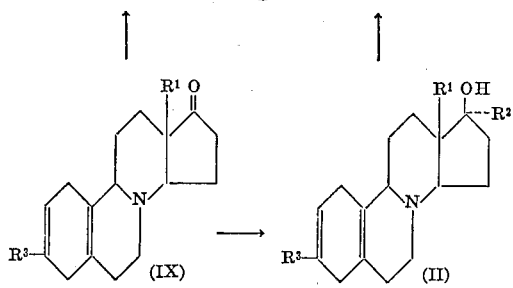

Those of the compounds of Formulae III and IV wherein $R^3$ stands for an alkoxy radical may be obtained as described in our co-pending U.S. applications Serial No. 280,723, filed May 15, 1963, and Serial No. 282,547, filed May 23, 1963, both now abandoned. The corresponding compounds wherein $R^3$ stands for an aralkoxy radical may be obtained by analogous procedures. The compounds of the Formula VI may be obtained by the interaction of the compounds of the Formula IV with an alkyl lithium of the formula $R^5.Li$ or an alkyl magnesium halide of the formula $R^5.Mg.X$, wherein $R^5$ stands for a lower alkyl radical and X stands for a halogen atom, for example the iodine atom. Alternatively, those of the compounds of the Formula VI wherein $R^5$ stands for a lower alkyl radical of more than one carbon atom may be obtained by the interaction of the compounds of the Formula IV with an alkali metal alkynide, for example sodium acetylide, in dimethylsulphoxide, to afford the compounds of the Formula V, wherein $R^4$ stands for a lower alkynl radical, followed by catalytic hydrogenation, for, example hydrogenation using a palladium-on-charcoal catalyst, of the latter compounds. Those of the compounds of the Formula II wherein $R^2$ stands for a lower alkyl radical may be obtained by the interaction of the compounds of the Formula VI with an alkali metal, for example lithium, and liquid ammonia and a proton source, for example an alcohol, for example t-butanol, in a solvent, for example tetrahydrofuran, ether or dioxane.

The compounds of the Formula VII may be obtained by the interaction of the compounds of the Formula III or IV with an alkali metal borohydride, for example sodium borohydride, in a solvent, for example methanol.

The compounds of the Formula VIII, i.e. those of the compounds of the Formula II wherein $R^2$ stands for hydrogen, may be obtained by the reduction of the compounds of the Formula IV or VII by the procedure described above for the conversion of the compounds of the Formula VI into those of the Formula II wherein $R^2$ stands for a lower alkyl radical. The compounds of the Formula IX may be obtained by Oppenauer oxidation of the compounds of the Formula VIII. Those of the compounds of the Formula II wherein $R^2$ stands for a lower alkenyl radical may be obtained by the interaction of the compounds of the Formula IX with a lower alkenyl magnesium halide, and those of the compounds of the Formula II wherein $R^2$ stands for a lower alkynyl radical may be obtained by the interaction of the compounds of the Formula IX with an alkali metal lower alkynide in dimethylsulphoxide.

The heterocyclic compounds of the Formula I and the salts thereof possess progestational, androgenic and anabolic properties.

According to a further feature of the invention, therefore, we provide pharmaceutical compositions comprising one or more compounds of the Formula I or the salts thereof and a pharmaceutically-acceptable diluent or carrier therefor.

The pharmaceutical compositions of the invention may be in the form of tablets, capsules, aqueous or oily solutions, aqueous or oily suspensions, emulsions, sterile injectable aqueous or oily solutions or suspensions, or dispersible powders.

Suitable tablets may be formulated by admixture of the active ingredient(s) with known pharmaceutical excipients, for example inert diluents, for example calcium carbonate, calcium phosphate, lactose or mannitol, disintegrating agents, for example maize starch or alginic acid, binding agents, for example starch, gelatin or acacia mucilage, and lubricating agents, for example magnesium stearate, stearic acid or talc. Such tablets may optionally be coated by known techniques in order to delay disintegration in the stomach and thus to provide a sustained action over an extended period.

The aqueous suspensions, emulsions, oily solutions and suspensions of the invention generally contain a sweetening agent, for example glycerol, dextrose or sucrose, and a flavouring agent, for example vanillin or orange extract, in order to provide a palatable product. The aqueous suspensions of the invention may also contain suspending or thickening agents, for example sodium carboxymethylcellulose, wetting agents, for example condensation products of fatty alcohols with ethylene oxide, and preservatives, for example methyl or propyl p-hydroxybenzoate.

The emulsions of the invention may contain the active ingredient(s) dissolved in an oil of vegetable or animal origin, for example arachis oil or cod liver oil, and may also contain sweetening agents and flavoring agents which may with advantage be essential oils. The said emulsions may also contain emulsifying agents and dispersing agents, for example soya bean lecithin, polyoxyethylene sorbitan monooleate, gum acacia, gum tragacanth or casein, and preservatives, for example methyl or propyl p-hydroxybenzoate, and antioxidants, for example propyl gallate.

The oily solutions of the invention likewise may contain the active ingredient(s) in solution in an oil of vegetable or animal origin, and may optionally contain flavoring agents to mask the taste and improve oral acceptability. Such oily solutions may advantageously be filled into soft gelatin capsules. The oily solutions may also contain sweetening agents, for example icing sugar, in which case the oil phase may in addition contain a suspending agent, for example beeswax, to maintain the redispersion properties of the suspension.

Oral compositions in the form of gelatin capsules may consist of capsules containing active ingredient(s) only or the capsules may contain the active ingredient(s) in admixture with inert diluents, for example lactose or sorbitol.

The sterile injectable aqueous suspensions of the invention may contain a suspending or thickening agent, for example sodium carboxymethylcellulose, and a wetting or dispersing agent, for example a phenol-polyethylene oxide condensate, for example the condensation product of octylcresol with about 8–10 molecular proportions of ethylene oxide. The sterile injectable oily solutions of the invention may be prepared from a non-toxic injectable oil, for example arachis oil or ethyl oleate, and they may additionally contain gelling agents, for example aluminum stearate, to delay absorption within the body. These aqueous and oily injectable preparations may contain preservatives such as methyl or n-propyl p-hydroxybenzoate or chlorobutanol.

The pharmaceutical compositions of the invention may optionally additionally contain one or more known medicinal steroids.

As indicated above, the heterocyclic compounds of the invention are also useful as intermediates. Thus, as described in our co-pending U.S. application Serial No. 361,535, filed April 21, 1964, interaction of the said heterocyclic compounds with a base, for example sodium hydroxide, in aqueous methanol affords the corresponding compounds of the formula:

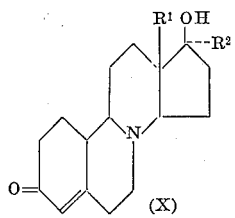

wherein $R^1$ and $R^2$ have the meanings stated above, which possess therapeutic properties.

The invention is illustrated but not limited by the following examples in which the parts are by weight except where otherwise stated:

*Example 1*

A solution of 0.445 part of (±)-3-methoxy-8-azaoestr-2,5(10)-dien-17β-ol in 25 parts of 0.1 M-aqueous oxalic acid solution is kept under an atmosphere of nitrogen at ambient temperature for 90 minutes. The solution is then basified with a saturated aqueous potassium carbonate solution and the resulting mixture is filtered. The solid residue is crystallised from a mixture of benzene and petroleum ether (B.P. 60–80° C.) and there is thus obtained (±)-8-azaoestr-5(10)-en-17β-ol-3-one, M.P. 161–165° C.

The (±)-3-methoxy-8-azaoestr-2,5(10)-dien-17β-ol may be obtained as follows:

To a suspension of 0.855 part of (±)-3-methoxy-8-azaoestr-1,3,5(10)-trien-17-one (M.P. 172–173° C.; obtained as described in Example 2 in our co-pending U.S. application Serial No. 282,547) in 40 parts of methanol there is added 0.342 part of sodium borohydride. The mixture is stirred for 1 hour and then acidified to pH 1 with 3 N-hydrochloric acid. The methanol is evaporated under reduced pressure, 40 parts of ice-water are added to the residue, and the solution is basified to pH 12 with 2 N-sodium hydroxide solution. The mixture is extracted three times, each time with 20 parts of chloroform, the combined chloroform extracts are washed with water, and the solvent is then evaporated under reduced pressure. The residue is crystallised from aqueous methanol and there is thus obtained (±)-3-methoxy-8-azaoestr-1,3,5(10)-trien-17β-ol hemi-hydrate, M.P. 98–100° C. The corresponding anhydrous compound, M.P. 118–121° C., may be obtained by heating a benzene solution of the hemi-hydrate under reflux for 2 hours in an apparatus containing a Dean and Stark water-trap, and then evaporating the benzene and crystallising the residue from petroleum ether (B.P. 80–100° C.).

To a stirred solution of 5.74 parts of (±)-3-methoxy-8-azaoestr-1,3,5(10)-trien-17β-ol in a mixture of 170 parts by volume of anhydrous liquid ammonia, 85 parts of t-butanol and 85 parts of tetrahydrofuran there are added 4.2 parts of lithium in small pieces. The mixture is stirred for 3¾ hours, 75 parts of methanol are then added and the ammonia is allowed to evaporate. 200 parts of water are added to the residue, and the organic solvents are then evaporated under reduced pressure. The resulting mixture is filtered, and the solid residue is dried in vacuo over potassium hydroxide. There is thus obtained (±)-3-methoxy-8-azaoestr-2,5(10)-dien-17β-ol, M.P. 110–120° C.

Alternatively (±)-3-methoxy-8-azaoestr-1,3,5(10)-trien-17β-ol hemi-hydrate may be obtained by a similar process to that described above but using as starting materials 0.281 part of (±)-3-methoxy-8-azaoestr-1,3,5-(10),9(11),14-pentaen-17-one (M.P. 116–118° C.; obtained as described in Example 2 in the complete specification in our co-pending application No. 21,414/62), 15 parts of methanol and 0.18 part of sodium borohydride.

*Example 2*

The process described in Example 1 for the preparation of (±)-8-azaoestr-5(10)-en-17β-ol-3-one is repeated except that the (±)-3-methoxy-8-azaoestr-2,5(10)-dien-17β-ol is replaced by the same weight of (±)-17α-ethyl-3-methoxy-8-azaoestr-2,5(10)-dien-17β-ol. There is thus obtained (±)-17α-ethyl-8-azaoestr-5(10)-en-17β-ol-3-one, M.P. 165–174° C. [crystallised from petroleum ether (B.P. 80–100° C.)].

The (±)-17-α-ethyl-3-methoxy-8-azaoestr-2,5(10)-dien-17β-ol may be obtained as follows:

0.36 part of sodium hydride is added to 37 parts of dry dimethylsulphoxide, and the mixture is stirred and heated at 60–70° C. under an atmosphere of nitrogen for 45 minutes. The resulting solution is cooled at 20° C., and purified acetylene (purified by passing through 2 wash-bottles containing water, through 3 wash-bottles containing concentrated sulphuric acid and finally up a tower packed with soda-lime) is slowly bubbled through it for 45 minutes. 1.43 parts of (±)-3-methoxy-8-azaoestr-1,3,5(10)-trien-17-one (M.P. 172–173° C.; obtained as described in Example 2 in our co-pending application Serial No. 282,547) are then added, and the resulting solution is stirred for 2 hours. 25 parts of 10% w./w. aqueous ammonium chloride solution are added, and the mixture is poured into 200 parts of ice-water. The mixture is filtered and the solid residue is crystallised from aqueous methanol. There is thus obtained (±)-17α-ethynyl-3-methoxy-8-azaoestr-1,3,5(10)-trien-17β-ol, M.P. 132–133° C.

A solution of 0.311 part of (±)-17α-ethynyl-3-methoxy-8-azaoestr-1,3,5(10)-trien-17β-ol in 30 parts of ethanol containing 0.15 part of a 5% palladium-on-carbon catalyst is shaken in an atmosphere of hydrogen at atmospheric pressure and ambient temperature until uptake of hydrogen ceases. The mixture is filtered, the ethanol is removed from the filtrate by evaporation under reduced pressure, and the residue is crystallised from petroleum ether (B.P. 80–100° C.). There is thus obtained (±)-17α-ethyl-3-methoxy-8-azaoestr-1,3,5(10)-trien-17β-ol, M.P. 136–138° C.

The process described in Example 1 for the preparation of (±)-3-methoxy-8-azaoestr-2,5(10)-dien-17β-ol is repeated except that the (±)-3-methoxy-8-azaoestr-1,3,5(10)-trien-17β-ol is replaced by the same weight of (±)-17α-ethyl-3-methoxy-8-azaoestr-1,3,5(10)-trien-17β-ol. There is thus obtained (±)-17α-ethyl-3-methoxy-8-azaoestr-2,5(10)-dien-17β-ol, characterised by the presence in its infra-red spectrum of an absorption band at 3450 cm.$^{-1}$ and by the absence of absorption bands at 1500 and 1600 cm.$^{-1}$, and by its ultra-violet spectrum ($\lambda_{max.}^{methanol}$ 205 mμ, ε 5,800; transparent at 280 mμ)

*Example 3*

The process described in Example 1 for the preparation of (±)-8-azaoestr-5(10)-en-17β-ol-3-one is repeated except that the (±)-3-methoxy-8-azaoestr-2,5(10)-dien-17β-ol is replaced by the same weight of (±)-17α-ethynyl-3-methoxy-8-azaoestr-2,5(10)-dien-17β-ol. There is thus obtained (±)-17α-ethynyl-8-azaoestr-5(10)-en-17β-ol-3-one, M.P. 175–182° C.

The (±)-17α-ethynyl-3-methoxy-8-azaoestr-2,5(10)-dien-17β-ol may be obtained as follows:

A solution of 1 part of (±)-3-methoxy-8-azaoestr-2,5(10)-dien-17β-ol (obtained as described in Example 1) in 50 parts of toluene and 10 parts of cyclohexanone is stirred and heated in an atmosphere of nitrogen until toluene begins to distil slowly. When some 25 parts of toluene have been collected, a solution of 3 parts of aluminium isopropoxide in 50 parts of toluene is added slowly to the mixture. When a further 15 parts of toluene have been collected, distillation is ended, and the mixture is then heated under reflux for 2 hours. 20 parts of a saturated aqueous solution of sodium potassium tartrate are added, and the mixture is steam distilled under an atmosphere of nitrogen until all the cyclohexanone and toluene are removed. The residue is extracted four times, each time with 30 parts of chloroform, the combined extracts are washed with 30 parts of water, and the solvent is then evaporated under reduced pressure. The gummy residue is stirred together with 5 parts of petroleum ether (B.P. 40–60° C.) until it solidifies, the resulting mixture is filtered and the solid residue is washed with petroleum ether (B.P. 40–60° C.). There is thus obtained (±)-3-methoxy - 8 - azaoestr-2,5(10)-dien-17-one, M.P. 118–120° C.

0.216 part of sodium hydride is added to 25 parts of dry dimethylsulphoxide, and the mixture is stirred and heated at 60–70° C. in an atmosphere of nitrogen for 45 minutes. The resulting solution is cooled to 20° C., and purified acetylene (purified by the method as described in Example 2) is slowly bubbled through it for 45 minutes. 0.855 part of (±)-3-methoxy-8-azaoestr-2,5(10)-dien-17-one is then added, and the resulting solution is stirred for 2 hours. 15 parts of saturated aqueous sodium potassium tartrate solution are added, and the mixture is poured into 150 parts of ice-water. The mixture is filtered, the solid residue is successively washed with water and petroleum ether (B.P. 40–60° C.), and then dried at 15 mm. pressure over solid potassium hydroxide. There is thus obtained (±)-17α-ethynyl-3-methoxy-8-azaoestr-2,5(10)-dien-17β-ol characterised by the presence in its infra-red spectrum of absorption bands at 3450 cm.$^{-1}$ (OH) and 3300 cm.$^{-1}$ (—C≡CH) and by the absence of an absorption band at 1745 cm.$^{-1}$ (no 17-keto group), and by an $R_F$ value of 0.60 (thin-layer chromatography on alumina using 10% v./v. ethyl acetate in benzene as the developing solvent).

*Example 4*

A solution of 0.549 part of (±)-3-methoxy-17α-methyl-8-azaoestr-2,5(10)-dien-17β-ol in 40 parts of 0.1 M-aqueous oxalic acid solution is kept under an atmosphere of nitrogen at ambient temperature for 90 minutes. The solution is then basified with a saturated aqueous potassium carbonate solution, and the mixture is extracted three times, each time with 20 parts of chloroform. The combined extracts are washed with 20 parts of water, and the solvent is evaporated under reduced pressure. The residue is crystallised from petroleum ether (B.P. 80–100° C.) and there is obtained (±)-17α-methyl-8-azaoestr-5(10)-en-17β-ol-3-one, M.P. 132–136° C.

The (±) - 3-methoxy-17α-methyl-8-azaoestr-2,5(10)-dien-17β-ol may be obtained as follows:

A solution of methyl lithium in dry ether is prepared by stirring a mixture of 1.42 parts of methyl iodide, 0.112 part of lithium and 15 parts of dry ether at −10° C. for 1½ hours. The solution is decanted from the excess lithium, cooled to −10° C., and to it there is added 0.285 part of (±)-3-methoxy-8-azaoestr-1,3,5(10)-trien-17-one (M.P. 172–173° C.; obtained as described in Example 2 in our co-pending U.S. application Serial No. 282,547). The solution is stirred at −10° C. for one hour, then at ambient temperature for ½ hour, and is then heated under reflux for 2 hours. 5 parts of water are added, and the mixture is acidified with N-hydrochloric acid and then separated. The aqueous phase is basified with 2 N-sodium hydroxide solution and is then extracted three times, each time with 15 parts of chloroform. The combined chloroform extracts are washed with 15 parts of water, and the solvent is evaporated under reduced pressure. The residue is crystallised from petroleum ether (B.P. 80–100° C.), and there is thus obtained (±)-3-methoxy-17α - methyl - 8-azaoestr-1,3,5(10)-trien-17β-ol, M.P. 110–112° C.

The process described in Example 1 for the preparation of (±)-3-methoxy-8-azaoestr-2,5(10)–dien-17β-ol is repeated except that the (±)-3-methoxy-8-azaoestr1,3-5(10)-trien-17β-ol is replaced by the same weight of (±)- 3 - methoxy - 17α-methyl-8-azaoestr-1,3,5(10)-trien-17β-ol. There is thus obtained (±)-3-methoxy-17α-methyl-8-azaoestr-2,5(10)-dien-17β-ol, characterised by the presence in its infra-red spectrum of an absorption band at 3450 cm.$^{-1}$ and by the absence of absorption bands at 1500 and 1600 cm.$^{-1}$, and by its ultraviolet spectrum ($\lambda_{max.}^{methanol}$ 205 mµ, ϵ 5,700; transparent at 280 mµ)

*Example 5*

The process described in Example 4 for the preparation of (±) - 17α - methyl-8-azaoestr-5(10)-en-17β-ol-3-one is repeated except that the (±)-3-methoxy-17α-methyl-8-azaoestr-2,5,(10)-dien-17β-oil is replaced by the same weight of (±) - 17α-allyl-3-methoxy-8-azaoestr-2,5(10)-dien-17β-ol. There is thus obtained (±)-17α-allyl-8-azaoestr-5(10)-en-17β-ol-3-one, characterised by the presence in its infra-red spectrum of an absorption band at 1710 cm.$^{-1}$.

The (±) - 17α - allyl-3-methoxy-8-azaoestr-2,5(10)-dien-17β-ol may be obtained as follows:

A solution of 1.15 parts of allyl chloride in 5 parts of ether is added dropwise during 1 hour to a stirred suspension of 0.396 part of magnesium in ether. The mixture is stirred for a further hour, and a solution of 0.428 part of (±) - 3-methoxy-8-azaoestr-2,5(10)-dien-17-one (prepared as described in Example 3) in 10 parts of ether is added. The mixture is stirred for 1 hour at ambient temperature, and is then stirred and heated under reflux for 2 hours. The mixture is cooled to ambient temperature, 15 parts of saturated aqueous sodium potassium tartrate solution are added, and the mixture is separated. The aqueous phase is extracted twice, each time with 15 parts of chloroform, the combined chloroform extracts are washed with water, and the solvent is evaporated under reduced pressure. There is thus obtained (±) - 17α - allyl-3-methoxy-8-azaoestr-2,5(10)-dien-17β-ol, characterised by the presence on its infra-red spectrum of an absorption band at 3400 cm.$^{-1}$ and the absence of bands at 1745, 1600 and 1500 cm.$^{-1}$, and by an $R_F$ value of 0.70 (thin-layer chromatography on alumina using 10% v./v. ethyl acetate in benzene as the developing solvent).

*Example 6*

The process described in Example 1 for the preparation of (±) - 8 - azaoestr-5(10)-en-17β-ol-3-one is repeated except that the 0.445 part of (±)-3-methoxy-8azaoestr-2,5(10)-dien-17β-ol is replaced by the same weight of (±)-13-ethyl-3-methoxy-8-azagona-2,5(10)-dien-17β-ol. There is thus obtained (±)-13-ethyl-8-azagona-5(10)-en-17β-ol-3-one, M.P. 56–64° C.

The (±) - 13-ethyl-3-methoxy-8-azagona-2,5(10)-dien-17β-ol may be obtained by a similar process to that described in Example 1 for the preparation of (±)-3-methoxy - 8 - azaoestr-2,5(10)-dien-17β-ol except that the (±) - 3-methoxy-8-azaoestr-1,3,5(10)-trien-17-one is replaced by an equivalent weight of (±)-13-ethyl-3-methoxy-8-azagona-1,3,5(10)-trien-17-one (M.P. 129–130° C.; obtained as described in Example 3 in our co-pending application Serial No. 282,547). There is thus obtained (±) - 13-ethyl-3-methoxy-8-azagona-1,3,5(10)-trien-17β-ol, M.P. 142–145° C., an equivalent weight of which replaces (±)-3-methoxy-8-azaoestr-1,3,5(10)-trien-17β-ol in the second step of this process. There is thus obtained (±) - 13 - ethyl-3-methoxy-8-azagona-2,5(10)-dien-17β-ol, M.P. 154–157° C. [crystallised from light petroleum (B.P. 60/80° C.)].

(±) - 13 - ethyl-3-methoxy-8-azagona-1,3,5(10)-trien-17β-ol may alternatively be obtained by a similar process to that described in Example 1 for the preparation of (±) - 3 - methoxy-8-azaoestr-1,3,5(10)-trien-17β-ol, but replacing the (±) - 3 - methoxy-8-azaoestr-1,3,5(10),9(11),14-pentaen-17-one by an equivalent weight of (±)-13 - ethyl - 3 - methoxy-8-azagona-1,3,5(10),9(11),14-pentaen-17-one (M.P. 89–90° C.; obtained as described in Example 6 in our copending application Serial No. 280,723).

Example 7

The process described in Example 1 for the preparation of (±)-8-azaoestr-5(10)-en-17β-ol-3-one is repeated except that the 0.445 part of (±)-3-methoxy-8-azaoestr-2,5(10)-dien-17β-ol is replaced by the same weight of (±) - 13,17α-diethyl-3-methoxy-8-azagona-2,5(10)-dien-17β-ol, M.P. 175–178° C. There is thus obtained (±)-13,17α - diethyl-8-azagona-5(10)-en-17β-ol-3-one, M.P. 140–145° C.

The (±)-13,17α-diethyl-3-methoxy-8-azagona-2,5(10)-dien-17β-ol may be obtained as follows:

To a solution of 3 parts of (±)-13-ethyl-3-methoxy-8-azagona-1,3,5(10)-trien-17-one (see Example 6) in 200 parts of tetrahydrofuran there are added 4.5 parts of lithium acetylide-ethylenediamine complex, and the resulting suspension is stirred for 18 hours in an atmosphere of nitrogen at ambient temperature. 100 parts of ice-water are cautiously added, and the tetrahydrofuran is evaporated under reduced pressure. The residual mixture is extracted three times with ether, the combined extracts are washed twice with saturated aqueous sodium chloride solution, and the solvent is then evaporated. The residue is absorbed on to 90 parts of neutral alumina (Woelm, grade 1) and is then chromatographed. Elution with benzene and a benzene-ethyl acetate mixture (39:1) serves to remove unreacted starting material, and continued elution with benzene-ethyl acetate (9:1,4:1), followed by evaporation of the solvent affords (±)-13-ethyl - 17α-ethynyl-3-methoxy-8-azagona-1,3,5(10)-trien-17β-ol, M.P. 147–149° C. [crystallised from a mixture of light petroleum (B.P. 60–80° C.) and ethyl acetate]. This compound is reduced under the conditions described in Example 2 for the preparation of (±)-17α-ethyl-3-methoxy-8-azagona-1,3,5(10)-trien-17β-ol, and there is thus obtained (±)-13,17α-diethyl-3-methoxy-8-azagona-1,3,5(10)-trien-17β-ol, M.P. 150–152° C. [crystallised from light petroleum (B.P. 60–80° C.)]. This compound is reduced by means of a solution of lithium in liquid ammonia under the conditions described in Example 1 for the preparation of (±)-3-methoxy-8-azaoestr-2,5(10)-dien-17β-ol, and there is thus obtained (±)-13,17α-diethyl - 3-methoxy - 8-azagona-2,5(10)-dien-17β-ol, M.P. 175–178° C. [crystallised from light petroleum (B.P. 60–80° C.)].

Example 8

The process described in Example 1 for the preparation of (±)-8-azaoestr-5(10)-en-17β-ol-3-one is repeated except that the 0.445 part of (±)-3-methoxy-8-azaoestr-2,5(10)-dien-17β-ol is replaced by the same weight of (±) - 13-ethyl-17α-ethynyl-3-methoxy-8-azagona-2,5(10)-dien-17β-ol, M.P. 80–87° C. There is thus obtained (±) - 13-ethyl-17α-ethynyl-8-azagona-5(10)-en-17β-ol-3-one, characterised by an R$_F$ value of 0.6 (thin-layer chromatography on alumina using 1:9 ethyl acetate-benzene as the developing solvent).

The (±) - 13-ethyl-17α-ethynyl-3-methoxy-8-azagona-2,5(10)-dien-17β-ol used as starting material may be obtained as follows:

The process described in Example 3 for the preparation of (±)-3-methoxy-8-azaoestr-2,5(10)-dien-17-one is repeated except that the 1 part of (±)-3-methoxy-8-azaoestr-2,5(10)-dien-17β-ol is replaced by an equal weight of (±)-13-ethyl-3-methoxy-8-azagona-2,5(10)-dien-17β-ol (prepared as described in Example 6). There is thus obtained (±)-13-ethyl-3-methoxy-8-azagona-2,5(10)-dien-17-one, M.P. 148–149° C. This compound is then used as starting material in an analogous ethynylation process to that described in Example 7, and there is obtained (±)-13-ethyl-17α-ethynyl-3-methoxy-8-azagona-2,5(10)-dien-17β-ol, M.P. 165–169° C.

Example 9

The process described in Example 1 for the preparation of (±)-8-azaoestr-5(10)-en-17β-ol-3-one is repeated except that the 0.445 part of (±)-3-methoxy-8-azaoestr-2,5(10)-dien-17β-ol is replaced by the same weight of (±) - 3-methoxy - 13-n-propyl-8-azagona-2,5(10)-dien-17β-ol. There is thus obtained (±)-13-n-propyl-8-azagona-5(10)-en-17β-ol-3-one, M.P. 129–135° C.

The (±) - 3-methoxy-13-n-propyl-8-azagona-2,5(10)-dien-17β-ol used as starting material may be obtained by a similar process to that described in Example 1 for the preparation of (±)-3-methoxy-8-azaoestr-2,5(10)-dien-17β-ol except that the (±)-3-methoxy-8-azaoestr-1,3,5(10)-trien-17-one is replaced by an equivalent weight of (±)-3-methoxy-13-n-propyl-8-azagona-1,3,5(10)-trien-17-one (M.P. 123–124° C., obtained as described in Example 4 in our co-pending application Serial No. 282,547). There is thus obtained, as intermediate, (±)-3-methoxy-13-n-propyl-8-azagona-1,3,5(10)-trien-17β-ol, M.P. 147–151° C., and an equivalent weight of this compound replaces (±)-3-methoxy-8-azaoestr-1,3,5(10)-trien-17β-ol in the second step of the process. There is thus obtained (±) - 3 - methoxy-13-n-propyl-8-azagona-2,5(10)-dien-17β-ol, M.P. 175–180° C.

(±) - 3 - methoxy - 13-n-propyl-8-azagona-1,3,5(10)-trien-17β-ol may alternatively be obtained by a similar process to that described in Example 1 for the preparation of (±)-3-methoxy-8-azaoestr-1,3,5(10)-trien-17β-ol but replacing the (±) - 3 - methoxy - 8 - azaoestr-1,3,5(10),9(11),14-pentaen-17-one by an equivalent weight of (±) - 3 - methoxy - 13 - n - propyl - 8 - azagona - 1,3,5(10),9(11),14 - pentaen - 17 - one (M.P. 114–117° C.; obtained as described in Example 7 in our co-pending application Serial No. 280,723).

Example 10

The process described in Example 1 for the preparation of (±) - 8 - azaoestr - 5(10) - en - 17β - ol-3-one is repeated except that the 0.445 part of (±) - 3 - methoxy-8 - azaoestr - 2,5(10)-dien - 17β - ol - is replaced by an equal weight of (±) - 17α - ethyl - 3 - methoxy - 13 - n-propyl - 8 - azagona - 2,5(10) - dien - 17β - ol. There is thus obtained (±) - 17α - ethyl - 13 - n - propyl - 8-azagona - 5(10) - en - 17β - ol - 3 - one, characterised by an R$_F$ value of 0.7 (thin-layer chromatography on alumina using 1:9 ethyl acetate-benzene as the developing solvent).

The (±) - 17α - ethyl - 3 - methoxy-13-n-propyl-8-azagona - 2,5(10) - dien - 17β - ol used as starting material may be obtained as follows:

The process described in Example 7 for the preparation of (±) - 13,17α - diethyl - 3 - methoxy - 8 - azagona-2,5(10) - dien - 17β - ol is repeated except that (±)-13-ethyl - 3 - methoxy - 8 - azagona - 1,3,5(10) - trien - 17-one is replaced by (±) - 3 - methoxy - 13 - n - propyl - 8-azagona - 1,3,5(10) - trien - 17 - one (see Example 9). There is thus obtained (±) - 17α - ethyl - 3 - methoxy-13 - n - propyl - 8 - azagona - 2,5(10) - dien - 17β - ol, M.P. 151–155° C., via the following intermediates: (±)-17α - ethynyl - 3 - methoxy - 13 - n - propyl - 8 - azagona-1,3,5(10) - trien - 17β - ol, M.P. 137–140° C. (crystallised from aqueous methanol), and (±) - 17α - ethyl - 3-methoxy - 13 - n - propyl - 8 - azagona - 1,3,5(10) - trien-17β-ol, M.P. 83–86° C. [crystallised from light petroleum (B.P. 60–80° C.)].

Example 11

The process described in Example 1 for the preparation of (±) - 8 - azaoestr - 5(10) - en - 17β - ol - 3 - one is repeated except that the 0.445 part of (±) - 3 - methoxy-8 - azaoestr - 2,5(10) - dien - 17β - ol is replaced by an equal weight of (±) - 17α - ethynyl - 3 - methoxy - 13-n - propyl - 8 - azagona - 2,5(10) - dien - 17β - ol. There is thus obtained (±) - 17α - ethynyl - 13 - n - propyl - 8-azagona - 5(10) - en - 3 - one, M.P. 185–186° C. with decomposition.

The (±) - 17α - ethynyl - 3 - methoxy - 13 - n - propyl - 8 - azagona - 2,5(10) - dien - 17β - ol used as starting material may be obtained as follows:

The process described in Example 8 for the preparation of (±) - 13 - ethyl - 17α - ethynyl - 3 - methoxy - 8-azagona - 2,5(10) - dien - 17β - ol is repeated except that the 1 part of (±) - 13 - ethyl - 3 - methoxy - 8 - azagona-2,5(10) - dien - 17β - ol is replaced by an equal weight of (±) - 3 - methoxy - 13 - n - propyl - 8 - azagona - 2,5(10) - dien - 17β - ol (prepared as described in Example 9). There is thus obtained (±) - 17α - ethynyl-3 - methoxy - 13 - n - propyl - 8 - azagona - 2,5(10)-dien - 17β - ol, M.P. 160–163° C., [intermediate: (±)-3 - methoxy - 13 - n - propyl - 8 - azagona - 2,5(10)-dien - 17 - one, M.P. 140–142° C.].

*Example 12*

5 parts of (±) - 13,17α - diethyl - 8 - azagona - 5(10)-en - 17β - ol - 3 - one, 5 parts of maize starch and 48 parts of lactose are intimately mixed and granulated with 10% maize starch paste. The granules are dried at a temperature not exceeding 50° C., and then mixed with 0.5 part of magnesium stearate and compressed into tablets each weighing 60 mg. There are thus obtained tablets suitable for oral administration for therapeutic purposes.

What I claim is:

1. A heterocyclic compound selected from the group consisting of compounds of the formula:

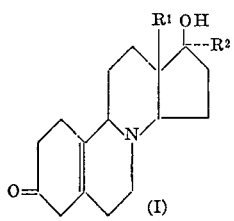

wherein $R^1$ stands for a lower alkyl radical selected from the group consisting of methyl, ethyl and n-propyl and $R^2$ stands for a member of the group consisting of hydrogen, methyl, ethyl, n-propyl, lower alkenyl and lower alkynyl, and the acid addition salts thereof.

2. Compounds as claimed in claim 1 which have the gonane configuration.

3. Compounds as claimed in claim 1 wherein $R^2$ stands for a member of the group consisting of methyl, ethyl, n-propyl, vinyl, allyl and ethynyl.

4. A compound selected from the group consisting of the compounds (±)-8-azaoestr-5(10)-en-17β-ol-3-one,
(±)-17α-methyl-8-azaoestr-5(10)-en-17β-ol-3-one,
(±)-17α-ethyl-8-azaoestr-5(10)-en-17β-ol-3-one,
(±)-17α-ethynyl-8-azaoestr-5(10)-en-17β-ol-3-one,
(±)17α-allyl-8-azaoestr-5(10)-en-17β-ol-3-one,
(±)-13-ethyl-8-azagona-5(10)-en-17β-ol-3-one,
(±)-13,17α-diethyl-8-azagona-5(10)-en-17β-ol-3-one,
(±)-13-ethyl-17α-ethynyl-8-azagona-5(10)-en-17β-ol-3-one,
(±)-13-n-propyl-8-azagona-5(10)-en-17β-ol-3-one,
(±)-17α-ethyl-13-n-propyl-8-azagona-5(10)-en-17β-ol-3-one, and
(±)-17α-ethynyl-13-n-propyl-8-azagona-5(10)-en-17β-ol-3-one, and the salts thereof.

5. An acid addition salt according to claim 1 wherein the acid is selected from the group consisting of hydrochloric acid and oxalic acid.

References Cited by the Examiner

UNITED STATES PATENTS 3,085,091  4/1963  Sawa et al. _____ 260—285

OTHER REFERENCES

Fieser et al., "Natural Compounds Related to Phenanthene," Reinhold, 1949, pp. 317, 335, and 375.

ALEX MAZEL, *Primary Examiner.*

NICHOLAS S. RIZZO, HENRY R. JILES, *Examiners.*

D. G. DAUS, *Assistant Examiner.*